United States Patent [19]

Bonis

[11] 4,370,369

[45] Jan. 25, 1983

[54] HEAT-SEALABLE SHEET AND CONTAINER

[75] Inventor: Laszlo J. Bonis, Swampscott, Mass.

[73] Assignee: Composite Container Corporation, Medford, Mass.

[21] Appl. No.: 279,855

[22] Filed: Jul. 2, 1981

[51] Int. Cl.³ .............. B65D 85/00; B32B 1/02; B32B 1/04; B32B 27/08
[52] U.S. Cl. .................... 428/35; 428/346; 428/349; 428/483; 428/515; 428/516; 428/520
[58] Field of Search .............. 428/35, 483, 516, 517, 428/520, 346, 347, 349, 515

[56] References Cited

U.S. PATENT DOCUMENTS

| 3,865,302 | 2/1975 | Kane | 229/43 |
|---|---|---|---|
| 3,925,591 | 12/1975 | Breitenfellner et al. | 428/516 |
| 4,037,008 | 7/1977 | Tugwell | 428/349 |
| 4,123,576 | 10/1978 | Kobayashi et al. | 428/35 |
| 4,188,443 | 2/1980 | Mueller et al. | 428/483 |
| 4,194,039 | 3/1980 | Mueller | 428/516 |
| 4,206,844 | 6/1980 | Thukamoto et al. | 428/515 |
| 4,252,846 | 2/1981 | Romesberg et al. | 428/520 |
| 4,274,900 | 6/1981 | Mueller et al. | 428/483 |

Primary Examiner—William J. Van Balen

[57] ABSTRACT

A multilayered thermoplastic sheet, suitable for forming into a heat-sealable container, comprising a structural layer for providing bulk and rigidity, a sticky heat-sealing layer on top of the structural layer for bonding the structural layer to a lid, and a nonsticky cover layer on top of the heat-sealing layer and made of material that permits contact and bonding of the heat-sealing layer to the lid when the heat-sealing temperature and pressure are applied.

20 Claims, 3 Drawing Figures

HEAT-SEALABLE SHEET AND CONTAINER

FIELD OF THE INVENTION

The invention relates to sheet material useful in making heat-sealable objects.

BACKGROUND OF THE INVENTION

In making a multilayered heat-sealable object having a heat-sealing layer on a structural layer, one is confronted with the problem that as the heat-sealing properties are improved, the object becomes too sticky to be stacked with similar objects or handled properly, but if the upper surface is made slippery enough to permit denesting and easy handling, poor heat-sealing results.

SUMMARY OF THE INVENTION

It has been discovered that by providing a nonsticky cover layer with particular properties on top of a sticky heat-sealing layer, denesting and handling is facilitated, and good heat-sealing properties are provided. The nonsticky layer is such that it will permit contact and bonding of the heat-sealing layer with another object (e.g., a cover) when the heat-sealing temperature and pressure are applied, but it also remains intact under thermoforming conditions and remains nonsticky during use of the product. For example, in some preferred embodiments the cover layer is made of material that dissolves into the heat-sealing layer when the heat-sealing temperature and pressure are applied; in other preferred embodiments the cover layer is made of very thin material that breaks up under the heat-sealing temperature and pressure to allow the heat-sealing material to come to the surface and bond to the other object. In the first mentioned preferred embodiments the cover layer is made of a polyolefin, and the heat-sealing layer is a polyolefin containing an adhesive that will bond to the other object and the structural layer; the adhesive is ethylene vinyl acetate or ethylene-vinyl acetate-malic anhydride terpolymer; and the structural layer is high impact polystyrene, methylacrylate butadiene styrene-acrylonitrile copolymer, polyethylene terephthalate, or glycol-modified polyethylene terephthalate. In the other preferred embodiments the very thin cover material that breaks up under heat-sealing temperature and pressure is polystyrene. The preferred method of making the sheet, in terms of ease of making and the quality of bonds between layers, is coextrusion.

The object made from the sheet is preferably a thermoformed container having a depressed portion surrounded by an annular flange, and a lid is heat-sealed to the container at the annular flange to provide a continuous, uninterrupted seal around the depressed portion.

The container made from the thermoplastic multilayered sheet can be advantageously used in sterilizing instruments by placing the instruments within the depressed portion, heat-sealing the lid (which is made of material permeable to disinfecting gases) to the flange portion, and placing the heat-sealed container in a disinfecting atmosphere. The nonsticky cover layer facilitates thermoforming the container and denesting a plurality of containers stacked together. Also, the additional step of coating a portion of the lid with sticky adhesive material, and the possible recontamination by handling and dust pick up, resulting from this step, are avoided. When the instruments are placed into the depressed portion, they will not stick to the heat-sealing layer because of the nonsticky cover layer. Because the heat-sealing temperature and pressure are applied only to the flange portion, the cover layer in the depressed portion remains intact while the cover layer at the flange portion dissolves, thereby permitting bonding of the lid with the heat-sealing layer. The disinfecting then occurs at a temperature at which the cover layer remains intact. After disinfecting, the lid can be easily peeled from the container, and because the bond between the heat-sealing layer and the structural layer is stronger than that between the heat-sealing layer and the lid, the lid is cleanly removed without peeling the heat-sealing layer from the structural layer.

DESCRIPTION OF THE PREFERRED EMBODIMENT

The structure, manufacture and preferred use of the preferred embodiment of the invention will now be described after first briefly describing the drawings.

DRAWINGS

STRUCTURE

Figure 1:
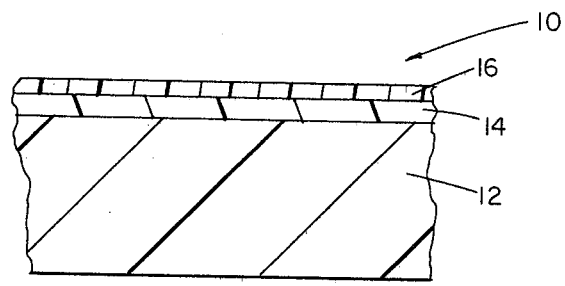
FIG. 1 is a vertical sectional view of a multilayered sheet according to the invention.

Referring to FIG. 1, there is shown coextruded sheet 10 made of 15 mil thick polystyrene structural layer 12, 1 mil thick heat-sealing layer 14 (polyethylene with 28% ethylene vinyl acetate having a melt flow index of 2.5–4.0 decigrams/min and available under the trade designation ELVA 3190 from Du Pont Co.), and 0.5 mil thick nonsticky cover layer 16 made of high flowing polyethylene (having a melt flow index of 9 decigrams/min and available under the trade designation NPE 1020 from Northern Petrochemical Corp.)

Figure 2:
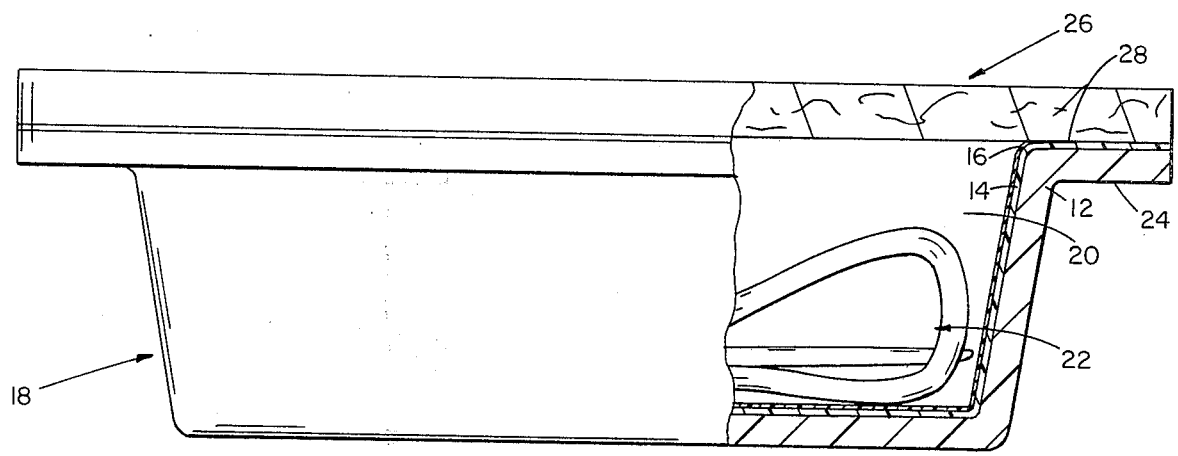
FIG. 2 is a partially cross-sectional elevation of a container made with the FIG. 1 sheet and having a cover heat-sealed to its flange.

Referring to FIG. 2, there is shown container 18 thermoformed from sheet 10. It has depressed portion 20, with instruments 22 in it, and annular flange portion 24, surrounding depressed portion 20. Heat-sealed on top of container 18 is lid 26 made of spun polyolefin cloth (available under the trade designation Tyvek from Du Pont). As is seen in FIG. 2, cover layer 16 does not exist in the flange portion 24; this is because the polyethylene at this portion has dissolved into the heat-sealing layer below it forming a thicker heat-sealing portion 28 with the adhesive slightly diluted.

MANUFACTURE

Figure 3:
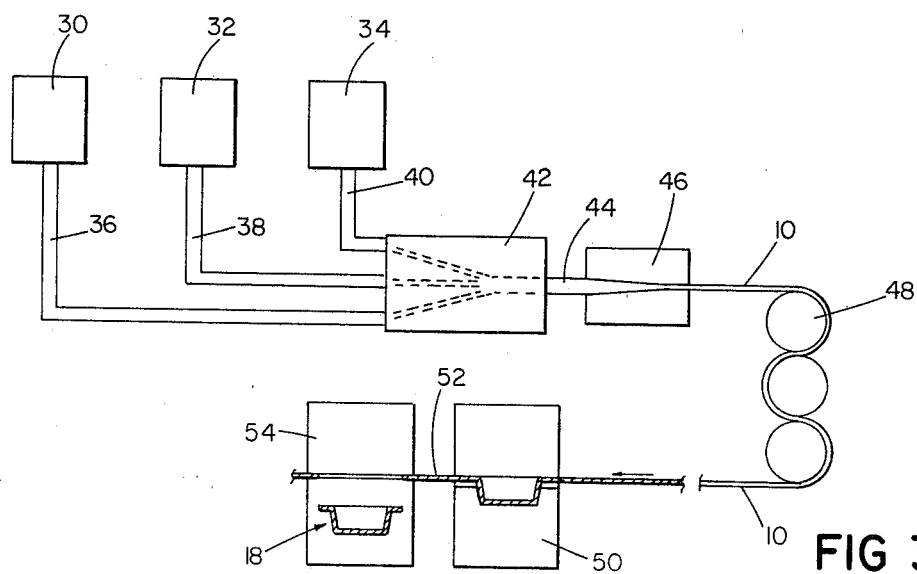
FIG. 3 is a diagrammatic view of the manufacturing process for forming the sheet and the container.

Turning to FIG. 3, the coextrusion and thermoforming process for forming container 18 is shown. Three heated containers 30, 32, 34 serve as sources of the polyethylene, the heat-sealing layer material of polyethylene with 28% ethylene-vinyl acetate adhesive, and polystyrene, respectively. The polyethylene is heated to about 400° F., the heat-sealing layer material is heated to about 380° F., and the polystyrene material is heated between 420° and 430° F.

Three conduits 36, 38, 40 supply heated material to coextrusion block 42. There the materials merge together to form under pressure a unitary, three-layer thick stream 44 of generally circular cross-section. Stream 44 passes into extrusion dye 46 (e.g., Welex standard 54" flex-lip dye), while maintained at a temperature of about 400° F., for extrusion into continuous sheet 10 about 16½ mils thick. Sheet 10 then passes through a series of chilled rolls 48. The sheet may then be processed into containers or wound into spools (not shown) for storage. To process sheet 10 into containers, the sheet is passed through conventional thermoforming apparatus 50 (vacuum forming type well-known in the art having a female mold), which impresses the container shape and in so doing reduces the wall thickness proportionally, the change in thickness being at a minimum at flange portion 24. The thermoforming occurs at 300° F. but the pressure during thermoforming is not sufficient to cause disintegration of cover layer 16 or dissolving of it into heat-sealing layer 14.

After thermoforming, the shaped sheet 52 passes through trim press 54, in which the individual containers 18 are separated. The material for cover layer 16 is high flowing relative to the material for heat-sealing layer 14, to permit a consistent coat at the particular dimensions.

USE

In use the instruments 22 are placed into depressed portion 20, and lid 26 is placed on top of container 18 so that contact is made with flange portion 24. Heat-sealing of lid 26 to the flange portion 24 then occurs at between 250° and 255° F. and about 20 psi. This temperature and pressure cause cover layer 16 to dissolve into layer 14, and the spun polyolefin cloth of lid 26 then contacts and bonds to the adhesive in layer 14. Because the heat-sealing temperature and pressure are only applied to the flange portion, the cover layer 16 in the depressed portion 20 remains intact. For the particular dimensions and materials described, it is desirable to keep the heat-sealing temperature within this 5° F. range to allow for a stronger bond between the heat-sealing layer 14 and the structural layer 12 than that formed between the heat-sealing layer 14 and lid 26. This avoids peeling heat-sealing layer 14 off structural layer 12 when lid 26 is subsequently peeled off container 18.

The instruments are then sterilized by placing the heat-sealed container 18 and lid 26 in a disinfecting atmosphere comprising ethylene oxide gas at 140° F. (Lid 26 is permeable to the gas.) After disinfecting, instruments 22 can be stored in the sealed container free from contamination by bacteria and particulates until it is desired to use them, at which time lid 26 can be easily peeled from container 18. In addition to providing for easy denesting, cover layer 16 is not as subject to contamination by picking up foregin particles as a sticky surface would be. Also, the handling of Tyvek lid 26 is kept to a minimum, and adhesive need not be applied to it, thereby reducing the chance of contaminating it.

OTHER EMBODIMENTS

Other embodiments are within the appended claims. For example other materials can be used for the different layers provided that the cover layer is such that it permits contact of lid 26 with heat-sealing layer 14 when the heat-sealing temperature and pressure are applied, so that a bond between the heat-sealing layer 14 and the lid 26 results. For example instead of providing a cover layer that dissolves into the heat-sealing layer, a very thin polystyrene layer can be used for cover layer 16, so that the cover layer breaks up at the heat-sealing temperature and pressure to allow the heat-sealing material to come to the surface of the flange portion 24 and to bond to the lid 26.

Also, using a heat-sealing layer 14 with a lower percentage of adhesive (e.g., 12 to 13% ethylene vinyl acetate) would permit more tolerance in the heat-sealing temperature at the same time that a clean peel is provided. Alternatively, a thicker cover layer 16 could be used, and the concentration of adhesive material in layer 14 could also be increased so that when the cover layer material dissolves into the heat-sealing layer 14, the concentration of adhesive will still be high enough to provide good bonding.

Finally, examples of other structural materials are high impact polystyrene, methylacrylate butadiene styrene-acrylonitrile copolymer, and polyethylene terephthalate and glycol-modified polyethylene terephthalate polyesters, and an example of a heat-sealing layer particularly appropriate for polyester structural layers is ethylene-vinyl acetate-malic anhydride terpolymer (available from Du Pont under the trade designation CXA 1104).

What is claimed is:

1. A thermoplastic sheet for use in making a first object capable of being bonded at a bond region by heat-sealing to a second object, said sheet comprising
   a rigid structural layer of sufficient thickness and strength to provide bulk and rigidity to said first object,
   a sticky heat-sealing layer on top of said structural layer, and
   a nonsticky cover layer on top of said heat-sealing layer, said cover layer being sufficiently thin and being made of material with strength and melt characteristics appropriate to cause exposure and bonding of said heat-sealing layer when heat-sealing temperature and pressure are applied to said bond region, and to cause the first object to have nonsticky surfaces before heat-sealing and after heat-sealing at regions other than said bond region.

2. The sheet of claim 1 wherein said cover layer is made of material that dissolves into the heat-sealing layer when said heat-sealing temperatures and pressure are applied.

3. The sheet of claim 1 wherein said cover layer is made of material that breaks up when said heat-sealing temperature and pressure are applied, thereby permitting said heat-sealing layer to rise to the surface and contact said second object.

4. The sheet of claim 2 wherein said cover layer is made of a polyolefin, and said heat-sealing layer is a made of polyolefin and an adhesive that will bond to said second object and said structural layer.

5. The sheet of claim 4 wherein said adhesive is ethylene vinyl acetate.

6. A thermoformed heat-sealable object for heat-sealable bonding at a bond region to a second object, said heat-sealable object comprising
   a rigid structural layer of sufficient thickness and strength to provide bulk and rigidity to said first object,
   a sticky heat-sealing layer on top of said structural layer, and
   a nonsticky cover layer on top of said heat-sealing layer, said cover layer being sufficiently thin and being made of material with strength and melt characteristics appropriate to cause exposure and bonding of said heat-sealing layer when heat-sealing temperature and pressure are applied to said bond region, and to cause the first object to have nonsticky surfaces before heat-sealing and after heat-sealing at regions other than said bond region.

7. The object of claim 6 in which said heat-sealable object is a container and said bond region is an annular flange surrounding a depressed portion, and said second object is a cover for sealing to said flange.

8. The object of claim 7 wherein said cover layer is made of material that dissolves into the heat-sealing layer when said heat-sealing temperature and pressure are applied.

9. The object of claim 7 wherein said cover layer is made of material that breaks up when said heat-sealing temperature and pressure are applied, thereby permitting contact of said heat-sealing layer with said second object.

10. The object of claim 7 wherein said cover layer is polyolefin, and said heat-sealing layer is made of a polyolefin and an adhesive that will bond to said second object and said structural layer.

11. The object of claim 10 wherein said adhesive is ethylene vinyl acetate.

12. The object of claim 7 wherein said cover is made of material permeable to disinfecting gases.

13. The sheet of claim 5 in which said structural layer is made of methylacrylate butadiene styrene-acrylonitrile copolymer, high impact polystyrene, polyethylene terephthalate, or glycol-modified polyethylene terephthalate.

14. The object of claim 11 in which said structural layer is methylacrylate butadiene styrene-acrylonitrile copolymer, high impact polystyrene, polyethylene terephthalate, or glycol-modified polyethylene terephthalate.

15. The sheet of claim 1, 2 or 13 in which said layers are coextruded.

16. The object of claim 6, 7 or 14 in which said layers are coextruded.

17. The sheet of claim 4 wherein said structural layer is polyester and said adhesive is ethylene-vinyl acetate-malic anhydride terpolymer.

18. The object of claim 10 wherein said structural layer is polyester and said adhesive is ethylene-vinyl acetate-malic anhydride terpolymer.

19. The sheet of claim 1 wherein said cover layer remains intact at thermoforming temperature and pressure.

20. The sheet of claim 1 wherein said cover layer remains intact at disinfecting temperature and pressure.

* * * * *